(12) United States Patent
Nikolay Nikolov et al.

(10) Patent No.: US 8,820,182 B2
(45) Date of Patent: Sep. 2, 2014

(54) APPARATUS FOR THE WIRELESS REMOTE MONITORING OF STORAGE TANK ROOFS

(75) Inventors: Tisonev Nikolay Nikolov, Victoria (CA); Dale John Shpak, North Saanich (CA)

(73) Assignee: Syscor Controls & Automation Inc., Victoria, BC (CA)

( * ) Notice: Subject to any disclaimer, the term of this patent is extended or adjusted under 35 U.S.C. 154(b) by 894 days.

(21) Appl. No.: 12/934,138

(22) PCT Filed: Mar. 24, 2009

(86) PCT No.: PCT/CA2009/000388
§ 371 (c)(1),
(2), (4) Date: Nov. 28, 2010

(87) PCT Pub. No.: WO2009/121169
PCT Pub. Date: Oct. 8, 2009

(65) Prior Publication Data
US 2011/0063107 A1    Mar. 17, 2011

Related U.S. Application Data

(60) Provisional application No. 61/072,347, filed on Mar. 31, 2008.

(51) Int. Cl.
*G01N 19/00* (2006.01)
*B65D 90/00* (2006.01)
*H04Q 9/00* (2006.01)
*B65D 88/34* (2006.01)

(52) U.S. Cl.
CPC ............ *H04Q 9/00* (2013.01); *H04Q 2209/40* (2013.01); *H04Q 2209/75* (2013.01); *H04Q 2209/886* (2013.01); *B65D 90/00* (2013.01); *H04Q 2209/30* (2013.01); *B65D 88/34* (2013.01); *B65D 2590/0083* (2013.01)
USPC .......................................................... 73/865.8

(58) Field of Classification Search
None
See application file for complete search history.

(56) References Cited

U.S. PATENT DOCUMENTS

| | | | | |
|---|---|---|---|---|
| 2,677,816 A | * | 5/1954 | Quist | 73/308 |
| 2,694,930 A | * | 11/1954 | Adams et al. | 374/116 |
| 3,085,434 A | * | 4/1963 | Orsinger et al. | 73/321 |
| 6,229,448 B1 | * | 5/2001 | Bennett et al. | 340/618 |
| 2007/0205907 A1 | * | 9/2007 | Schenk, Jr. | 340/623 |
| 2011/0063107 A1 | * | 3/2011 | Tzonev et al. | 340/539.24 |
| 2012/0073367 A1 | * | 3/2012 | Tzonev et al. | 73/305 |

FOREIGN PATENT DOCUMENTS

| | | | |
|---|---|---|---|
| JP | 63236914 | * | 10/1988 |
| JP | 410102813 | * | 4/1998 |
| JP | 2005215731 | * | 8/2005 |

* cited by examiner

*Primary Examiner* — Robert R Raevis
(74) *Attorney, Agent, or Firm* — Davis & Bujold, PLLC; Michael J. Bujold

(57) ABSTRACT

This invention relates to the remote monitoring of the floating roofs of large storage tanks, including tanks used for storing liquid petroleum products or other chemicals. The invention is used to monitor the position and flexure of the roof and other conditions such as vibration; the presence of vapors or liquids from water, hydrocarbons, or other chemicals; the presence of snow; or the presence of intruders. The invention can be connected to a monitoring system using wired or wireless means and can be used for routine status monitoring or for notifying plant operators in the event of alarm conditions. The invention can be completely self-contained and is suitable for encapsulation and use in harsh environments.

9 Claims, 6 Drawing Sheets

APPARATUS FOR THE WIRELESS REMOTE MONITORING OF STORAGE TANK ROOFS

This, application is a national stage completion of PCT/CA2009/000388 filed Mar. 24, 2009 which claims priority from U.S. Provisional Application No. 61/072,347 filed Mar. 31, 2008.

FIELD OF THE INVENTION

This invention relates to the remote monitoring of the floating roofs of large storage tanks, including tanks used for storing liquid petroleum products or other chemicals. The invention is used to monitor the position and flexure of the roof and other conditions such as vibration; the presence of vapors or liquids from water, hydrocarbons, or other chemicals; the presence of snow; or the presence of intruders. The invention can be connected to a monitoring system using wired or wireless means and can be used for routine status monitoring or for notifying plant operators in the event of alarm conditions. The invention can be completely self-contained and is suitable for encapsulation and use in harsh environments.

BACKGROUND OF THE INVENTION

Large storage tanks are often cylindrical and have a circular floating roof. The roof floats on the surface of the liquid, thereby decreasing the vapor space inside of the tank. A floating roof may be required for reasons of safety or for pollution reduction. The floating roof has a perimeter seal to seal it to the wall of the tank that helps to prevent the escape of the contained liquid or vapors from that liquid.

The floating roof is a large dynamic structure having a diameter of up to 100 meters and weighing several tons. This dynamic structure is subjected to changing forces from environmental conditions (temperature, wind, rain, snow, etc.) that affect the tank, the lid, or the contained liquid; convective forces within the liquid; or forces that occur when liquid is added or removed, including friction from the seal. The roof will flex and possibly tilt in response to these changes, which may result in the loss of the contained liquid or vapor. In extreme cases, the roof may tilt enough to cause it to sink into the tank.

The industry is therefore quite interested in monitoring systems that can be used to improve safety, reduce environmental concerns, or avoid major problems such as seal failure or a sunken roof.

There are existing patents that address the application of electronic monitoring or control to storage tank systems. For example, U.S. Pat. No. 4,596,266 (Kinghorn, et al., 1986) describes an electronic safety valve and system for controlling the roof drain on a hydrocarbon storage tanks for the purpose of allowing water drainage while preventing the escape of the contained liquid. U.S. Pat. No. 4,176,553 (Wood, 1979) describes a system for measuring the level of a liquid in a storage tank having a predetermined reference level. Although these patents are applied to storage tanks, they are essentially unrelated to the invention described herein. There is no existing art that addresses the roof monitoring system described herein.

U.S. Pat. No. 6,700,503 (Masar, et al. 2004) describes a means for wireless remote monitoring and graphically displaying the liquid level inside of a tank. The invention described herein does not incorporate a graphical display.

WIPO PCT filing 94/26627 (Christensen, 1994) describes a system for estimating the inclination of a storage tank roof by using float-based liquid level sensors and reed switches whereas the invention described herein uses solid-state micro electro-mechanical devices to directly measure inclination.

There is a considerable body of literature, standards, and patents that describe wireless sensor networks. A representative book that describes the current art is *Protocols and Architectures for Wireless Sensor Networks* by Karl Holger and Andreas Willig (Wiley, 2005).

U.S. Pat. No. 7,339,957 (Hitt, 2008) describes how transmission time slots are allocated to transmitting nodes in a system of wireless environmental sensors and actuators for the purpose of controlling irrigation systems. Although the invention described herein utilizes environmental sensors, it does use actuators nor does it rely upon a slotted communications protocol.

U.S. Pat. No. 7,386,352 (Davis, et al., 2008) describes a modular sensor network node architecture where the node architecture has each sensor coupled to its own small microprocessor so that it can be "plugged" into a sensor node containing a master microprocessor. The invention described herein is not modular and requires only a single microprocessor.

U.S. Pat. No. 7,468,661 (Petite et al. 2008) describes a system and method for monitoring and controlling remote devices. This patent describes a variety of application areas but does not address storage tank monitoring. In its Detailed Description, this patent "describes the data structure of messages sent and received using the invention". Throughout its claims, the communications system requires a retransmission device (e.g., "one or more retransmitting receivers") or a "computer program that formats and stores select information for retrieval on demand". The invention described herein does not require any of these components.

BRIEF SUMMARY OF THE INVENTION

The present invention provides a new apparatus for monitoring floating tank roofs. The invention comprises one or more intelligent Sensor Units and one or more Communication Units. The Sensor Unit integrates multiple sensors into a self-contained unit that can be completely encapsulated for use in harsh environments. Additionally, the unit may have a magnetic base for rapid installation on steel tank roofs. The Communication Unit communicates with the Sensor Units and with an external Monitoring System. The Communication Unit can be used to relay information from the Sensor Units to or from a Monitoring System and may contain a microprocessor for sensor fusion or for computing alarm conditions. The external Monitoring System uses existing art and is not considered further.

The Sensor Unit can incorporate batteries and/or solar cells for as a power source and communicates with the Communication Unit using a wireless communications link. Therefore, the invention does not require any external wiring, thereby simplifying deployment and improving reliability. It may also be encapsulated, thereby further improving reliability.

The Sensor Unit is comprised of several functional units including a microcontroller; a wireless communication module, an inclinometer or tilt sensor; and a liquid sensor. Any or all of several other functional modules may be incorporated into a the Sensor Unit: a vapor sensor (such as a hydrocarbon sensor); a temperature sensor; a position sensor that uses the Global Positioning System (GPS) or differential GPS; a proximity sensor; and a microelectromechanical (MEMS) accelerometer.

There is no known existing apparatus that is similar to the current invention.

DETAILED DESCRIPTION OF THE INVENTION

Figure 1:
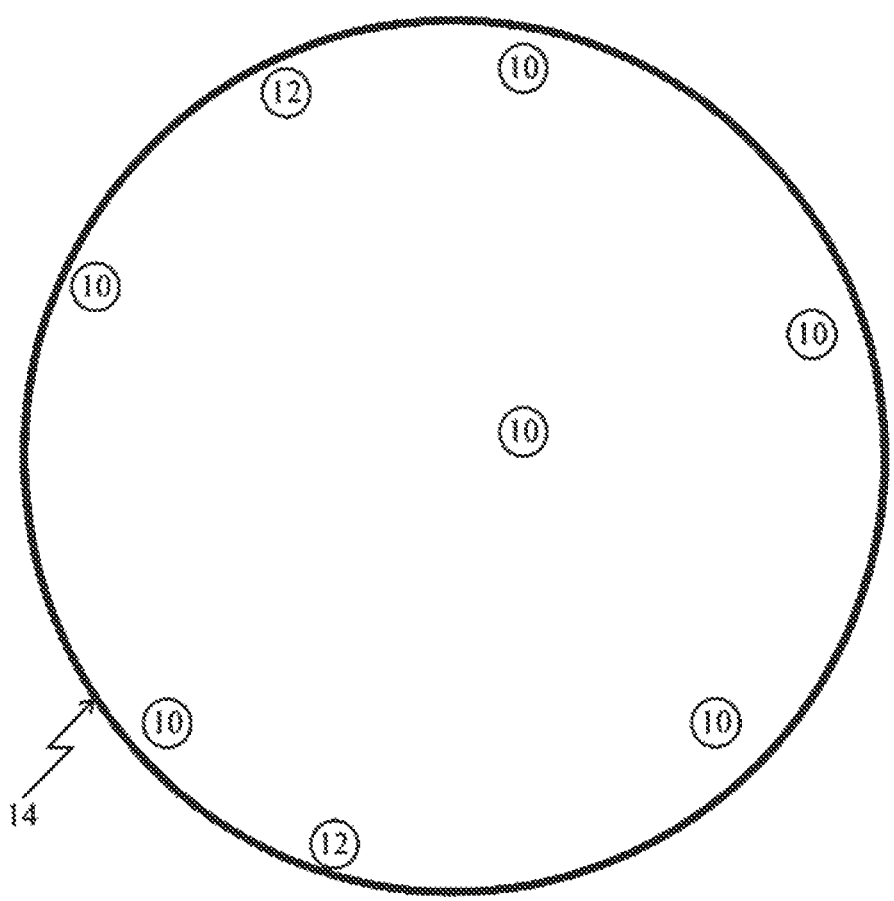
FIG. 1: Conceptual Plan View of the System Deployed on a Tank Roof

With reference to the conceptual plan view of a deployed system in FIG. 1, the invention consists of one or more encapsulated intelligent Sensor Units 10 and one or more Communication Units 12. The Sensor Units 10 are deployed on the floating roof of the tank whereas the Communication Units 12 are normally located near the top of the wall of the tank 14.

The Sensor Units 10 communicate with one or more Communication Units 12 via wireless means. As shown in FIG. 1, a plurality of Communication Units 12 can be employed, thereby adding redundancy to the system and improving the overall system reliability.

Figure 2:
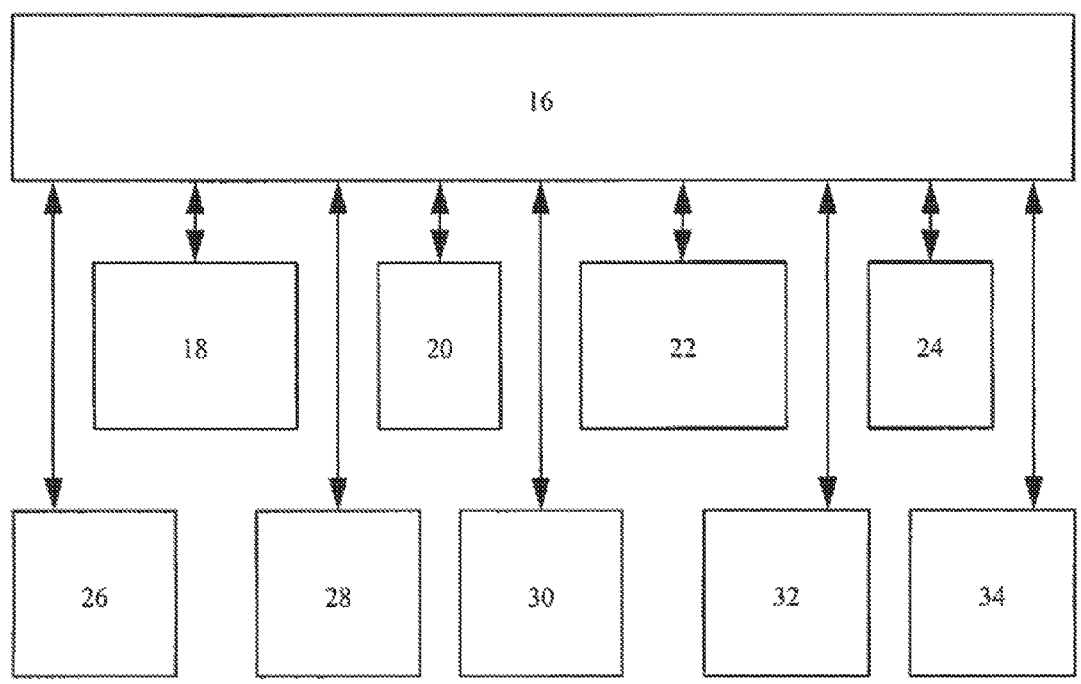
FIG. 2: Functional Block Diagram of the Sensor Unit

With reference to the functional block diagram in FIG. 2, said Sensor Unit 10 minimally comprises a power module 26 and the following core functional modules: a microcontroller 16; a communications module 18; an inclinometer or tilt sensor 28; and a liquid sensor 20. Optional functional modules that can be incorporated to enhance the utility of the Sensor Unit include: a vapor sensor 30; a temperature sensor 22; a position sensor 32 that employs the Global Positioning System (GPS) or differential GPS (dGPS); a proximity sensor 24 that can be used to detect birds or other intruders; and a microelectromechanical (MEMS) accelerometer 34 to detect vibrations and changes in position.

With reference to FIG. 2, the connecting lines between the microcontroller 16 and the modules (18 through 34) indicate communication links and are shown as being bidirectional but unidirectional connections are also possible. The communication link for the power module 26 is optional.

The Sensor Unit 10 is powered by a power module 26 employing batteries, solar cells, or a combination thereof. The Communication Unit 12 can be line powered or be powered by a power module employing batteries, solar cells, or a combination thereof.

For the purpose of identifying each Sensor Unit 10, each Sensor Unit 10 is uniquely identified by one or more identification numbers: an electronic identification number that is unique to a particular deployment and is set up during system configuration; an electronic identification number that is unique and is set up before system configuration; or an identification number that is based on the GPS position of the Sensor Unit 10.

In the current embodiment, the Communication Unit 12 is comprised of a Texas Instruments MSP430 microcontroller; a Texas Instruments CC2500 communications module for communicating with the sensor units; a Cirrus Logic CS8900A Ethernet Controller; and a power module containing solar cells and a rechargeable battery pack. The Communication Unit 12 communicates with the Sensor Units 10 and with an external Monitoring System. The Communication Unit 12 can be used to relay information from the Sensor Units 10 to or from a Monitoring System. The microprocessor 16 is re-programmable and can easily have software added to it for supporting sensor fusion or for computing alarm conditions. The Communication Unit 12 uses known technologies and is not described further.

Figure 3:
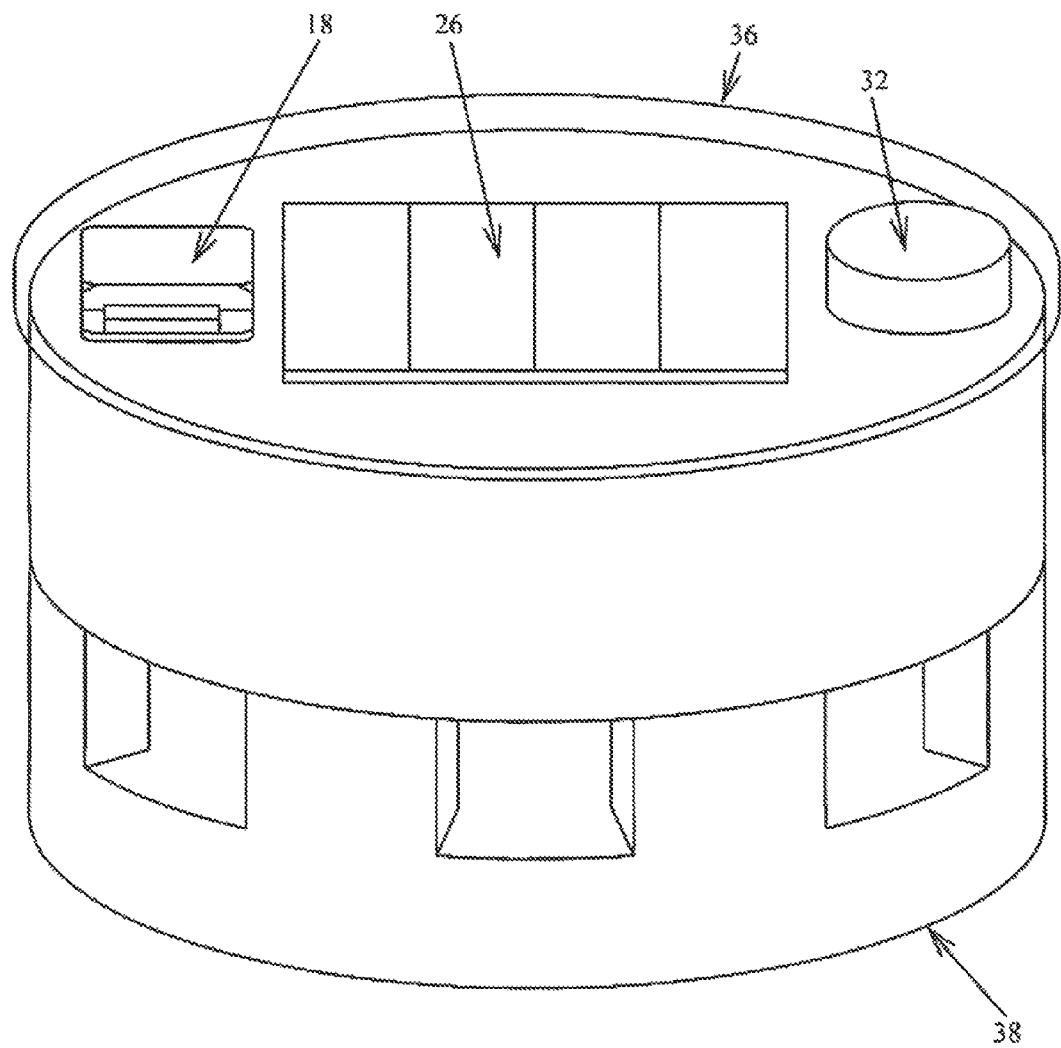
FIG. 3: Pictorial Drawing of the Sensor Unit

With reference to FIG. 3, the Sensor Unit 10 is preferentially encapsulated for use in harsh environments, including but not limited to chemical plants, petrochemical plants, and marine environments. The alternative to encapsulation is mechanical sealing systems, such as enclosures sealed with gaskets. The Sensor Unit is weatherproof and immersible. For illustrative purposes, the communications module 18, the position sensor 32, and a solar panel (a possible component of the power module 26) are shown covered by a transparent dome 36 in FIG. 3.

Preferentially, each Sensor Unit 10 incorporates a magnetic base 38 for rapid attachment to ferrous metal structures such as the floating lid of a storage tank. It may also be mounted using adhesives or mechanical means including fasteners or clamps.

The Sensor Unit 10 may incorporate a GPS or dGPS position sensor module 32 to facilitate rapid and inexpensive installation. In this scenario, the Sensor Units 10 can be installed without regard for the specific location of any other particular Sensor Unit 10. Subsequent information received from said position sensor module 32 allows the position of the Sensor Unit 10 to be determined after installation.

In the current embodiment of the Sensor Unit, the core functional modules displayed in FIG. 2 are implemented using: a Texas Instruments MSP430 microcontroller; a Texas Instruments CC2500 communications module, an Analog Devices ADIS16209 digital inclinometer, and an ultrasonic liquid sensor that is described next.

Figure 4:
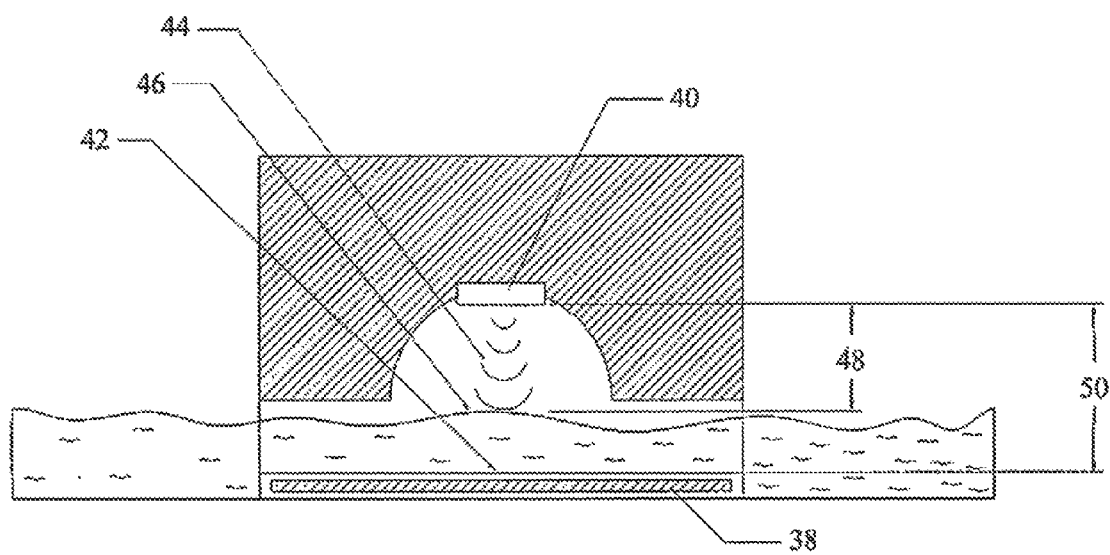
FIG. 4: Liquid Level Measurement Technique

With reference to FIG. 4, the preferred embodiment of the ultrasonic liquid sensor is comprised of: an ultrasonic transducer 40; an electronics module for the transducer that uses the existing art; and an acoustically-reflective surface 42 that may be the surface of the tank roof. In response to a command signal from the microcontroller 16, the transducer transmits an acoustic pulse 44 toward said reflective surface 42 located at a known distance $d_2$ 50. The first reflection from said pulse 44 will be received by the transducer 40 after a propagation delay of $$t_S = \frac{2d_1}{v_A}$$

where $t_S$ is the round-trip propagation delay for the pulse; $d_1$ 48 is the distance to the surface 46 of the liquid; and $v_A$ is the velocity of acoustic propagation in the ambient atmosphere. Since we can use well-known methods to measure the propagation delay $t_S$, and we know $d_2$ and $v_A$, we can use this equation to accurately determine the depth $(d_2-d_1)$ of the liquid. If $d_1$ is computed to be approximately equal to $d_2$, then no measurable amount of liquid is present.

The utility of the invention can be enhanced by additionally considering a second reflection due to the acoustic pulse. The round-trip propagation delay, $t_2$, of said second pulse is given by $$t_2 = \frac{2d_1}{v_A} + \frac{2(d_2 - d_1)}{v_L}$$

where $v_L$ is the velocity of acoustic propagation in the liquid. Since we can use the previous equation to determine $d_1$ and we know $v_A$ and $d_2$, we can use this new equation to determine $v_L$. In many practical application areas, such as the storage of petrochemicals, the computed value of $v_L$ can be used to determine if the liquid that is detected by the liquid sensor is the stored liquid, water, or a combination thereof. This type of liquid sensor and the techniques and the specific components required for its implementation are known in the existing state of the art.

The current embodiment of the Sensor Unit includes the following optional sensor modules: a MicroChemical MiCS 5524 hydrocarbon vapor sensor, a Texas Instruments TMP275 temperature sensor, and a Tyco A1037-A GPS module.

Since the Sensor Unit is designed to be immersible, the vapor sensor should be protected from contact with possibly damaging liquids. With reference to the conceptual cross-sectional diagram in FIG. 5, this is accomplished by placing the vapor sensor 52 inside of a hollow channel or dome 54, which is shown as in FIG. 5. As the liquid level rises into said channel or dome, the atmospheric pressure inside of the channel or dome 54 increases. As shown in FIG. 6, this increase in atmospheric pressure in the entrained atmosphere 60 prevents the liquid 62 from rising into the channel or dome 54 far enough to reach the vapor sensor.

Figure 5:
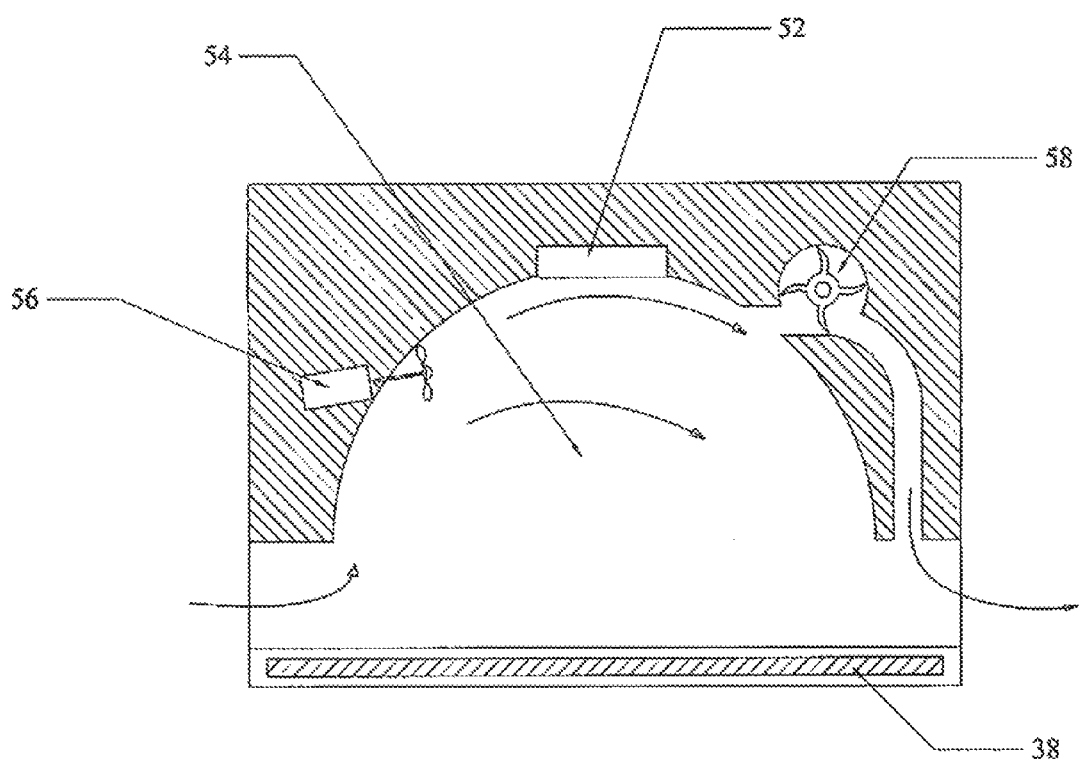
FIG. 5: Use of a Channel or Dome to Protect the Vapor Sensor from Immersion
Figure 6:
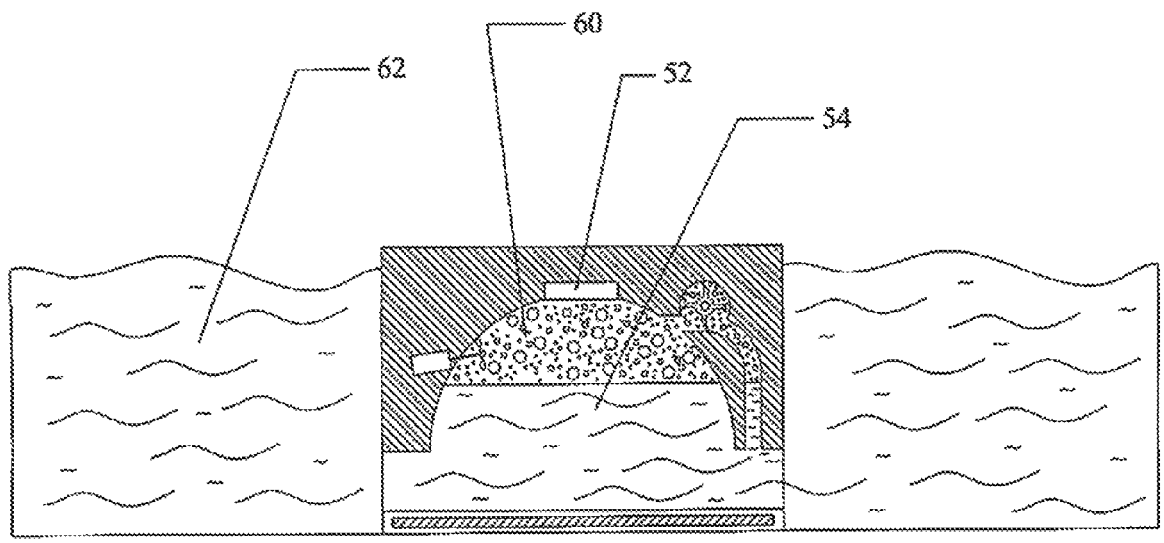
FIG. 6: Submerged Sensor Unit

With reference to FIG. 5, the channel or dome 54 preferentially contains a means, such as a rotary or piezoelectric fan 56 or a pump 58, for circulating the ambient atmosphere across the surface of the vapor sensor 52. The operation of said circulation device 56 or 58 is controlled by the microcontroller 16. In FIG. 5, the conceptual flow of atmosphere is indicated by curved arrows.

Communications among the system components (the Sensor Units 10, the Communication Units 12, and the external Monitoring System) may be initiated using one or more of the methods described in the following four paragraphs. In all cases, communications between any Sensor Unit 10 and the Monitoring System must pass through a Communication Unit 12.

The Monitoring System can send a request to one or more Sensor Units 10. The Sensor Units 10 will subsequently reply with the requested information. This type of communications is referred to as polling.

The Sensor Units 10 can send periodic status messages to the Monitoring System. These periodic messages can contain information from the sensors; alarm status; and/or information regarding the state of the Sensor Unit 10, such as battery condition. This type of communications is referred to as periodic.

The Sensor Units 10 can send messages to the Monitoring System in the event that an alarm condition has been detected by one or more Sensor Units 10. This type of communication is referred to as event-driven.

The Sensor Units 10 can communicate with each other to exchange sensor status and/or they can act as communications relays to improve the reliability or the range of the wireless communication system. This type of communication is referred to as local. Communications between the Sensor Units 10 and/or Communication Units 12 can use mesh networking protocols to improve reliability.

What is claimed is:

1. A system for monitoring the state of a floating storage tank roof, the system comprising in combination:
    the floating storage tank roof, which floats upon liquid in a storage tank, is open to external environment;
    two or more sensors are positioned on the floating storage tank roof, and at least one of the two or more sensors is a tilt sensor to measure a local inclination of the tank roof;
    a microcontroller that monitors a status of the two or more sensors; and
    a wireless communication module for relaying data from the microcontroller to one or more supervisory Communication Units;
    wherein the two or more sensors, the microcontroller and the wireless communication module form a Sensor Unit and the Sensor Unit is one of encapsulated or mechanically sealed to protect the Sensor Unit from the external environment.

2. The system of claim 1, further comprising a Global Positioning System or differential Global Positioning System receiver that is used to determine a location of the Sensor Unit.

3. The system of claim 1, wherein one of the two or more sensors within the Sensor Unit is a vapor sensor that detects vapors released from the storage tank, and the vapor sensor is positioned in a physical channel within the Sensor Unit.

4. The system of claim 3, further comprising at least one of a fan or a pump to circulate ambient vapors across the vapor sensor.

5. The system of claim 1, wherein one of the two or more sensors is a liquid sensor.

6. The system of claim 1, wherein one of the two or more sensors is a temperature sensor that measures ambient temperature in a vicinity of the Sensor Unit.

7. The system of claim 1, wherein one of the two or more sensors is a proximity sensor that detects a proximity of any animal to the Sensor Unit.

8. The system of claim 1, wherein system power is provided by solar cells which is charged by a solar panel that forms part of the Sensor Unit.

9. The system of claim 1, wherein the Sensor Unit has a magnetic base that is used for attaching the Sensor Unit to the tank roof.

* * * * *